United States Patent [19]

Chao et al.

[11] Patent Number: 5,212,693
[45] Date of Patent: May 18, 1993

[54] SMALL PROGRAMMABLE ARRAY TO THE ON-CHIP CONTROL STORE FOR MICROCODE CORRECTION

[75] Inventors: Hu H. Chao, Pleasantville, N.Y.; Jung H. Chang, Saratoga, Calif.

[73] Assignee: IBM Corporation, Armonk, N.Y.

[21] Appl. No.: 561,630

[22] Filed: Aug. 2, 1990

[51] Int. Cl.⁵ ............................................. G06F 11/00
[52] U.S. Cl. .................... 371/10.1; 371/10.2; 371/8.1
[58] Field of Search .............. 371/10.1, 10.2, 10.3, 371/8.1; 395/375, 550

[56] References Cited

U.S. PATENT DOCUMENTS

| | | | |
|---|---|---|---|
| 4,231,089 | 10/1980 | Lewine et al. | 364/200 |
| 4,471,472 | 9/1984 | Young | 371/10.1 X |
| 4,644,539 | 2/1987 | Sato | 371/11.1 |
| 4,648,075 | 3/1987 | Segawa et al. | 371/10.1 X |
| 4,733,394 | 3/1988 | Giebel | 371/21.1 |
| 4,926,319 | 5/1990 | Wilkie et al. | 395/550 |

FOREIGN PATENT DOCUMENTS

| | | |
|---|---|---|
| 0089891 | 9/1983 | European Pat. Off. |
| 58-16349 | 1/1983 | Japan |
| 58-16350 | 1/1983 | Japan |
| 59-85545 | 5/1984 | Japan |

OTHER PUBLICATIONS

Sibbers et al., "Patch RAM Load Technique," IBM Technical Disclosure Bulletin, vol. 27, No. 6, Nov. 1984.
IBM Technical Disclosure Bulletin, vol. 31, No. 11, Apr. 1989.

Primary Examiner—Robert W. Beausoliel, Jr.
Assistant Examiner—Ly V. Hua
Attorney, Agent, or Firm—Scully, Scott, Murphy & Presser

[57] ABSTRACT

An apparatus for correcting a faulty microcode contained in a control store of a microprogrammed processor. The apparatus comprises two functional parts; namely, the detection circuit for detecting operational codes that correspond to faulty microinstructions in the main control store ROM of the system and a programmable array which is used as the storage area for substitute microinstructions. The detection circuit is a circuit which operates as a logic NOR circuit and is utilized to detect valid operational codes of macroinstructions that correspond to microcode sequences that contain errors or faults. The programmable array consists of two loadable RAM's which contain error free microcode to replace the faulty microcode. The detection and correction occurs in parallel with the instruction decoding so that it does not have any impact on system cycle time.

26 Claims, 2 Drawing Sheets

SMALL PROGRAMMABLE ARRAY TO THE ON-CHIP CONTROL STORE FOR MICROCODE CORRECTION

BACKGROUND OF THE INVENTION

1. Field of the Invention

The present invention relates to a circuit arrangement for the detection of errors associated with the implementation of a processor instruction, and more particularly, to a small programmable array for the detection and correction of errors associated with instructions having an invalid microcode sequence.

2. Description of the Prior Art

The programming language utilized to program microprocessors or processors in general is commonly referred to as assembler language or assembly language. Each individual assembler instruction is referred to as a macroinstruction, and each macroinstruction usually consists of a plurality of microinstructions. Microinstructions are the basic or primitive instructions that the microprocessor or processor can perform. The macroinstructions are a higher level language then the microinstructions and typically require several states to complete execution. Depending on the particular microprocessor or processor, the microinstructions required to implement a specific macroinstruction will vary.

A microprocessor or processor system consists basically of three main modules; namely, the microcontrol logic module, the control memory logic module, and the data path module. The two major functional areas of concern are the microcontrol logic module and the control memory logic module. The data path module is responsible for the manipulation of data through the system. The microinstructions are stored in the control memory and are collectively referred to as the system or processor firmware. Each microinstruction consists of a plurality of fields including one field which is used in conjunction with the processor control flags and the operation code of the macroinstruction to determine the next sequential microinstruction to be executed. The other primary field is used to control the data path. The macroinstruction operation code is read by the microcontrol logic and determines which microroutine to execute next.

In high speed processors, the control memory is usually constructed of bipolar ROMS and PROMS and by replacing the particular ROM, the entire macroinstruction set can be changed. In conventional processors, ROM is widely used for implementing an on-chip control store (control memory). As compared with an off-chip control store, this approach eliminates chip-crossing in the critical path and offers a very large data width, both of which are crucial for the high speed performance of the system. ROM is chosen because it has a density which is approximately 10 times better than that of static RAM. However, ROM can only be programmed with mask levels during fabrication which becomes a major disadvantage during the system development stage. A simple microcode error can block the whole system development effort for a significant amount of time. It is therefore desirable to detect and correct instructions without having to reprogram to ROM.

U.S. Pat. No. 4,644,539 to Sato discusses a variety of earlier conventional circuit arrangements for processing a fault or an error occurring in a control memory. One such circuit arrangement for the detection and correction of errors associated with incorrect instructions comprises an error detecting circuit and an error correcting circuit together with a control memory loaded with a plurality of microinstructions. The error detecting circuit is for detecting an error of each microinstruction read out of the control memory while the error correcting circuit is for correcting the error to obtain a correct microinstruction. With this structure, each microinstruction is always sent from the control memory through both the error detecting circuit and the error correcting circuit even when an error is not detected by the error detecting circuit. Therefore, an increase of a machine cycle is inevitable.

In another conventional circuit arrangement, the error detection alone is normally carried out for each microinstruction read out of a control memory by the use of an error detection circuit. An error correction circuit is operated only when an error is detected by the error detection circuit. With this structure, it is possible to shorten the machine cycle as compared with the above-mentioned circuit arrangement. However, the error correction circuit corrects an error of each microinstruction each time an erroneous portion of control memory is accessed. Therefore, it takes a long time to process each microinstruction read out of the erroneous portion. This lengthens the average time of executing the microinstructions when the hardware error occurs in the control memory.

Both of the above described prior art circuit arrangements carry out not only error detection but also error correction on occurrence of an error. In order to enable the error correction, each microinstruction should be formed by an error correcting code. Although the error detection alone is simply possible by addition of one or more parity bits, such as error correcting code requires extra redundant bits greater in number than the parity bit or bits, as is well known in the art. Thus, use of the error correcting code results in the control memory of an increased bit capacity. In addition, neither of the above described prior art circuit arrangements can correct microcode errors resulting from programming mistakes.

One embodiment for correcting errors in microcode is disclosed by Chang et al. in IBM Tech. Dis. Bal. 31,11 (April 1989), which uses a programmable instruction detection circuit. When there is an error associated with the implementation of an instruction, the detection circuit can be programmed to recognize the op code, and the instruction can be treated as an un-implemented instruction. Software emulation can be written to execute the instruction and bypass the problem. However, this system cannot verify the correctness of the revised microcode.

Japanese Patent No. 58-16349 discloses a memory extension substituting system to facilitate the substitution of faulty instructions with error free instructions. In this patent, the implementation of the system is based on the detection of a particular address of the microinstruction rather than on the detection of a particular operational code of the instruction. When a particular address is detected, a substitute address pointing to an area of memory which has error free microinstructions is provided. A no-op cycle for timing purposes has to be inserted when the microinstruction is invalidated by the system. This no-op state can happen in the middle of the execution of an instruction, which can make the design and debugging of the system more difficult.

Japanese Patent No. 58-16350 also discloses a memory extension substituting system. In this patent, when the specific address of a microinstruction with a fault is detected by a coincidence means, a substitute instruction is provided. Basically, to correct n microinstructions, the detection circuit detects and generates replacement addresses for n microaddresses. However, it is only feasible to implement a system capable of handling n microinstructions, where n is limited to small numbers due to the limitation on the size and performance of the detection circuits.

Japanese Patent No. 59-85545 discloses a correcting and processing system for the contents of a system ROM. In this patent, the system disclosed provides for a technique which involves the bypassing of errors in the system ROM containing the system program, and not errors in the control store ROM which contains the microcode.

SUMMARY OF THE INVENTION

The present invention is directed to an apparatus for correcting a faulty microcode contained in a control store of a microprogrammed processor. The apparatus comprises a programmable detection circuit for detecting a predetermined macroinstruction having at least one faulty microinstruction contained in the control store, and a first programmable array directly addressable by said programmable detection circuit in response to the detection of the predetermined macroinstruction. The first programmable array contains at least one error free microinstruction to replace, at least the one faulty microinstruction. The apparatus further comprises a second programmable array addressable by a microsequencer of the microprogrammed processor. The second programmable array contains at least one error free microinstruction to replace, if necessary, a sequence of microinstructions of the predetermined macroinstruction. In addition, the apparatus utilizes a multiplexor circuit for determining whether a particular microinstruction is to be fetched from a main control store ROM, the first programmable array, or the second programmable array, and a multiplexor selection logic circuit for controlling the multiplexor. The multiplexor selection logic circuit receives a detection signal from the programmable detection circuit and a next address signal from the microsequencer.

The programmable detection circuit of the apparatus is an addition to the already existing instruction decoding logic of a central processing unit chip to bypass problems created by the implementation of an instruction error. Basically, the detection circuit is used to detect the operational code for a macroinstruction which has a faulty microcode sequence. Upon detection of such an operational code, the first microinstruction of a replacement microsequence is fetched from the first programmable array which is a loadable control store RAM. The second programmable array is a second loadable RAM which can be utilized to store the remaining microinstructions of the microcode sequence if necessary. By having the first instruction in a separate RAM, the detection circuit can directly address the memory location through a wordline. The revised section can be concatenated with the remaining microcode in the main control store ROM to complete the instruction.

The apparatus for microcode correction provides for the efficient correction of short microcode sequences, errors at the beginning of long microcode sequences, and for sparse errors at the end of the microcode sequences. The present invention provides for correction of multiple errors by the detection of the specific operational codes of those instructions, which can be of variable length. The present invention can be implemented on a single VLSI chip, and thus requires little extra power consumption and area on the processor board. In addition, the present invention provides for the detection and correction of microinstructions in a parallel process with the normal instruction decoding and therefore, it does not impact the cycle time of the processor.

DETAILED DESCRIPTION OF THE INVENTION

The apparatus of the present invention for correcting a faulty microcode contained in a control store of a microprogrammed processor is an addition to the already existing instruction decoding logic and microcontrol logic, of a microprogrammed processor. The apparatus is used to detect the operational code for an instruction or macroinstruction which has an incorrect microcode instruction or sequence of instructions. When such an operational code is detected, the first control word of the instruction is fetched from an associated entry point of a small loadable control store RAM. The first section of the incorrect microcode sequence is replaced by revised microcodes stored in the RAM, which include up to the last microcode error in the sequence. The revised section can be concatenated with the remaining microcode in the ROM to complete the instruction. This detection process occurs in parallel with the instruction decoding so that it does not have any impact to the cycle time.

Figure 1:
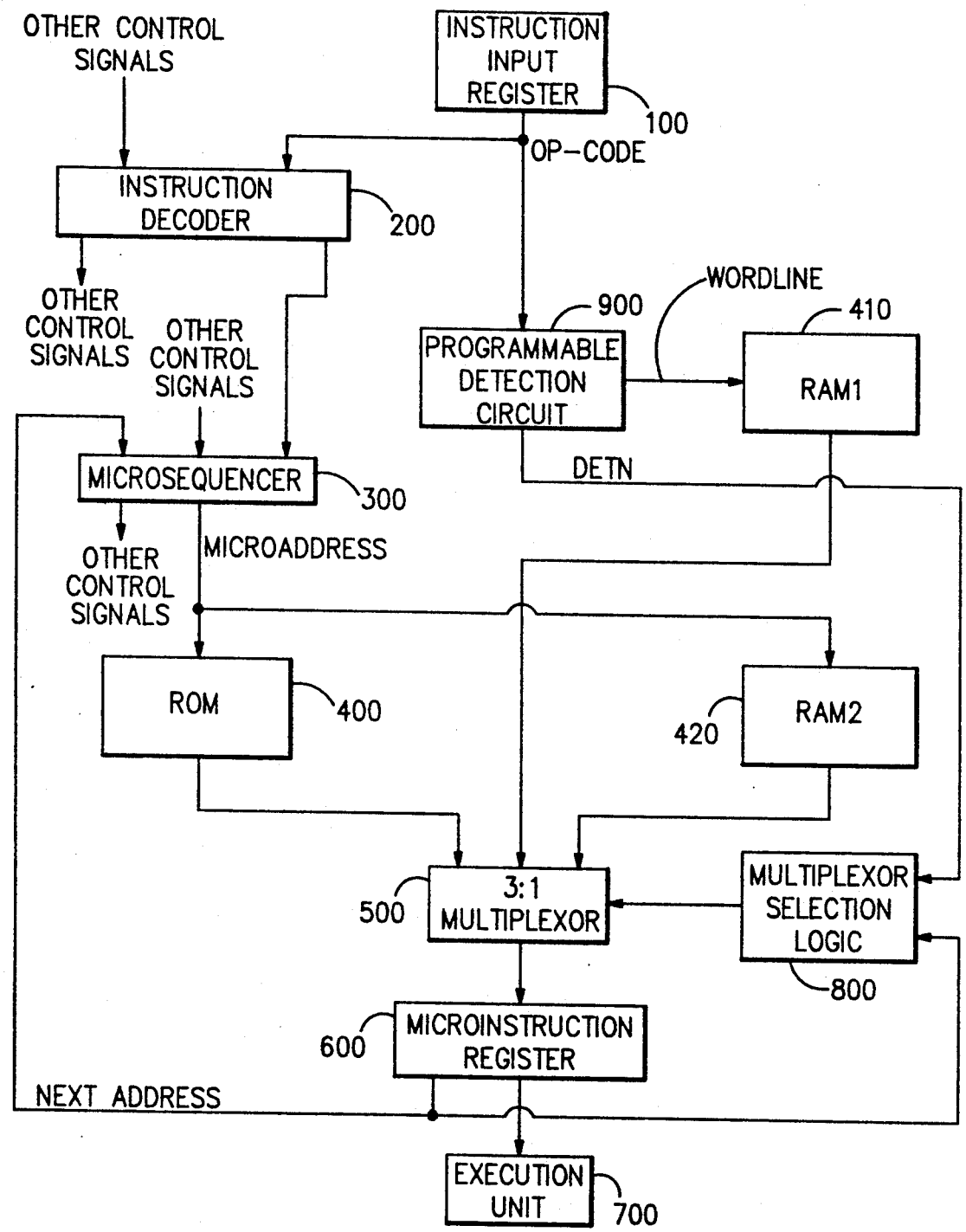
FIG. 1 is a block diagram illustrating the architecture of a microprogrammed processor implemented with a small programmable array to the ROM for microcode correction.

Referring to FIG. 1, there is shown a block diagram illustrating the architecture of a microprogrammed processor having an apparatus of the present invention for microcode or microinstruction correction. The basic microprogrammed processor comprises three major functional elements; namely, the microcontrol logic module, the control memory module, and the data path module. For purposes of illustrating the present invention, it is not necessary to include a detailed description of the data path module and the functions it serves; however, a complete description of the interrelation between the microcontrol logic module and the control memory module serves to illustrate the various functions of the small programmable array of the present invention.

In the normal execution of a macroinstruction, which is the instruction a programmer would enter, the instruction is stored in an instruction input register 100 for immediate storage. The operational code of the particular macroinstruction is isolated from the remaining fields of the instruction and fed into an instruction decoder 200 which decodes other instructions as well as the operational code. The instruction decoder 200 is a logic circuit which generates the starting address of the microinstruction sequence utilized to implement the particular macroinstruction. The starting address of the microinstruction sequence is the address of the first microconstruction of the microsequence. Basically, the address is just the physical location in memory of the particular information or data to be utilized. This decoded starting address is then sent to the microsequencer 300. The microsequencer 300 is the part of the microcontrol logic which controls the execution of a particular microsequence. Basically, the microsequencer 300 is responsible for the order in which the microconstructions are executed. The starting address from the microsequencer 300 is then passed to the control store ROM 400. The control store ROM 400 contains all of the microcode or firmware of the processor system. In order to achieve high speed in processors, the control memory is typically implemented using ROM technology. The output of the control store ROM 400, which is the first microinstruction, is passed through a multiplexor 500 to a microinstruction register 600 where the microinstruction is stored until it is to be utilized to control the execution unit 700 of the microprocessor (not shown). A complete description of the use of the multiplexor 500 will be given subsequently.

Included as part of every microinstruction is the next address signal or NEXTADDRESS, which s the microaddress of the next microinstruction in that particular microsequence. The NEXTADDRESS is outputted from the microinstruction register 600 and is fed back to the microsequencer 300 and to a multiplexor selection logic circuit 800 which is used to control the operation of the multiplexor 500. Under normal operation, operation where there are no exception cases detected in this cycle, the microsequencer 300 once again passes the address of the next microinstruction in the microsequence to the control store ROM 400 where the specified microinstruction is fetched and passed to the microinstruction register 600 through the multiplexor 500. This is a repeatable loop type process which continues until the end of the microsequence for the particular macroinstruction is achieved.

When the operational code of the macroinstruction corresponds to a known error in a particular microinstruction or an error in the entire microsequence, the programmable detection circuit 900 will detect the presence of this particular operational code, and will provide an error detection signal, Detect Not (DETN), to the multiplexor selection logic circuit 800. In addition, the programmable detection circuit 900 is used as a wordline decoder for a first small loadable RAM array 410 to select the microinstruction(s) which will replace the faulty microinstruction(s) stored in the control store ROM 400. A loadable RAM is a RAM which can be loaded from input/output devices of the micro-system, and can be implemented in a variety of technologies including static RAM (SRAM), dynamic RAM (DRAM), or electrically erasable PROM (EEPROM). Basically, the first loadable RAM 410 contains the first microinstruction of the new microsequence. This new microinstruction is fetched out of the first loadable RAM 410 and sent to the microinstruction register 600 via the multiplexor 500. The contents of the first loadable RAM 410 are utilized as opposed to the contents of the control store ROM 400, which usually contains all the microcode, because the programmable detection circuit 900 sends the error detection signal, DETN, to the multiplexor selection logic circuit 800. It should be noted that this detection and correction process occurs in parallel with the instruction decoding so that it does not have any impact to the cycle time of the processor or microprocessor.

The NEXTADDRESS of this new microinstruction, output from the microinstruction register 600, is inputted to the microsequencer 300. The microsequencer 300 is part of the microcontrol logic of the system, and is responsible for selecting the control memory address of the next microinstruction to be executed. The microsequencer 300 is basically a state machine which determines the order in which microinstructions are executed based on several factors including the current macroinstruction, the processor status, and the previous microinstruction. Based on these factors, the microsequencer 300 will either output an address that corresponds to the control store ROM 400 or a second loadable RAM 420. If the previous microinstruction has a NEXTADDRESS which corresponds to the second loadable RAM 420, the microsequencer will output a microaddress that corresponds to a location in the second loadable RAM 420. The second loadable RAM 420 is where the remaining microinstructions of the new microsequence are stored. Therefore, the next microinstructions in the new microsequence will be fetched from the second loadable RAM 420. Once again, the multiplexor selection logic circuit 800 is responsible for selecting this particular memory device. This process of fetching and utilizing the microinstructions from the second loadable RAM 420 continues until the last microcode error in the original microsequence stored in the control store ROM 400 is reached. The NEXTADDRESS of this last microinstruction in the second loadable RAM 420 points back to the original control store ROM 400. Since this last microinstruction points back to the original control store ROM 400, the revised section of microcode can be concatenated with the remaining microcode in the control store ROM 400 to complete the particular macroinstruction.

The multiplexor 500 is utilized to determine which memory storage device, the control store ROM 400, the first loadable RAM 410, or the second loadable RAM 420, the microinstruction or microsequence is to be fetched from. Since there are three choices of memory devices, a three-to-one multiplexor is utilized. The select signal for the multiplexor 500 is supplied by the multiplexor selection logic circuit 800. The multiplexor selection logic circuit 800 outputs a particular value for the select signal based on two inputs; namely, the Detect Not signal, DETN, and the NEXTADDRESS signal supplied by the microinstruction register 600. Basically, the multiplexor 500 selection logic can be summarized as follows: If the microcontrol logic is in the first cycle of a microsequence and DETN equals a logic one, thus indicating that the microsequence for this particular operational code is without error, then the control store ROM 400 is selected. If the microcontrol logic is in the first cycle of a microsequence and DETN equals a logic zero, thus indicating a microsequence with an error or multiple errors, then the first loadable RAM 410 is selected. If the NEXTADDRESS address points to a memory location in the second loadable RAM 420, then the second loadable RAM 420 is selected. Lastly, if none of the above situations are present control store ROM 400 is selected.

As was stated previously, the programmable detection circuit 900 is utilized to detect legal or valid operational codes of macroinstructions that correspond to microcode sequences that contain errors or faults. For illustrative purposes, the Intel 8080 microprocessor MOV macroinstruction will be used in an example of how the programmable detection circuit 900 operates. The Intel 8080 MOV macroinstruction is eight bits in length and consists of three separate fields; namely, the operational code field which consists of two bits (bits 7 and 6), the destination register field which consists of three bits (bits 5, 4 and 3) and the destination code field which consists of three bits (bits 2, 1 and 0). In the present invention, the programmable detection circuit 900 is designed to detect specific operational codes and thus the operational code field of the macroinstruction is of primary concern in the following illustration. In machine language, the MOV A,D macroinstruction is given by MOV A,D 01 010 111. (1) The left most two bits of equation 1 are the operational code of the MOV macroinstruction. As was stated previously, the programmable detection circuit 900 is utilized to detect operational codes having errors in their corresponding microcode sequences, thus for purposes of this illustration, it is assumed that the microsequence for the MOV instruction contains errors and the programmable detection circuit 900 detects this operational code and redirects the processor to a valid microcode sequence contained or stored in another location; namely, the first loadable RAM 410 or the second loadable RAM 420 shown in FIG. 1.

Figure 2:
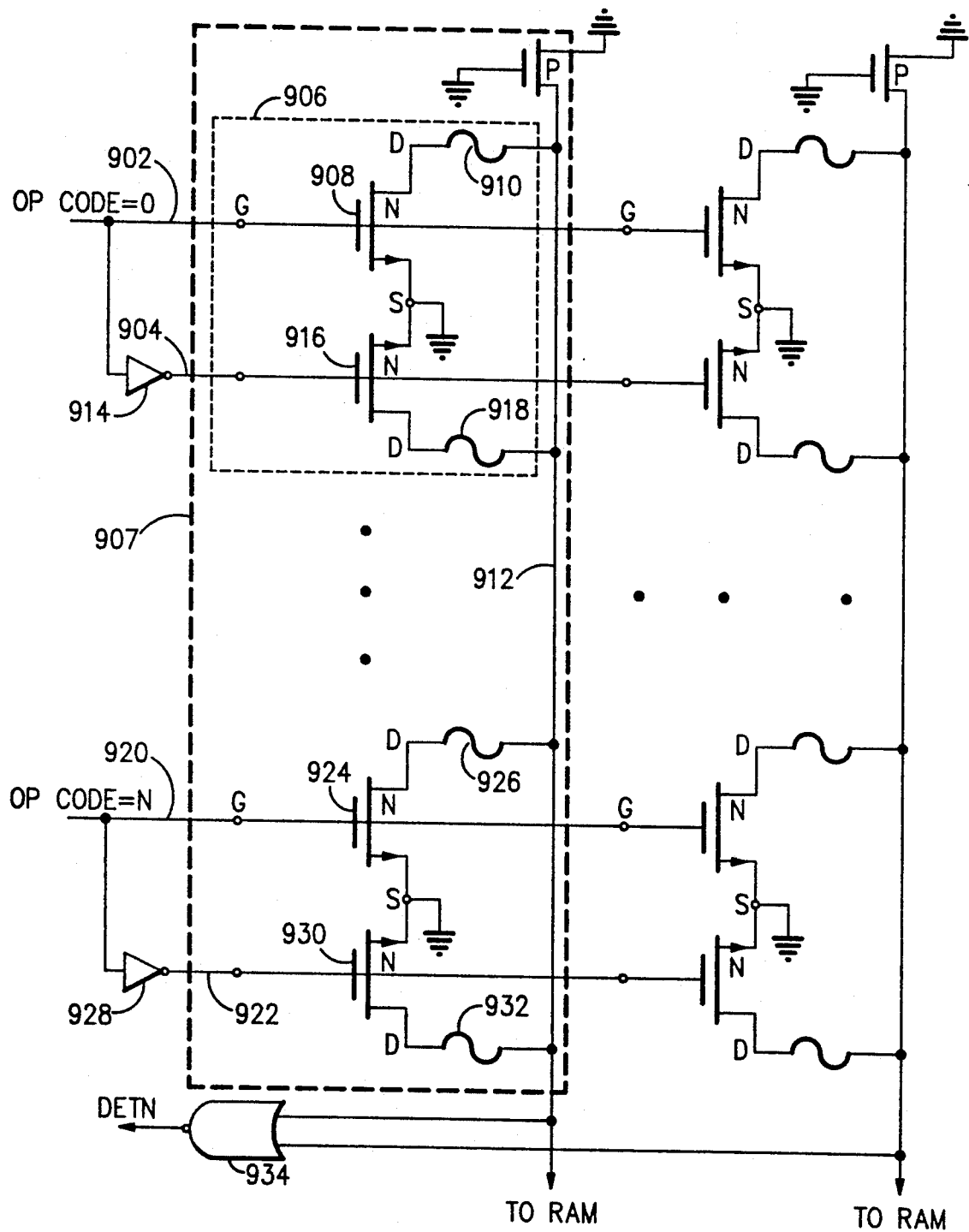
FIG. 2 is a schematic circuit diagram illustrating the design of a programmable detection circuit utilized by the small programmable array to the ROM for microcode correction.

Referring now to FIG. 2, there is shown a schematic representation of the programmable detection circuit 900 of the present invention. The most significant bit, bit 7, of the instruction given in equation 1 is brought into the programmable detection circuit 900 via a first true bit line 902 and a first complement bit line 904. The first true bit line 902 and the first complement bit line 904 both lead into a dual transistor and fuse circuit 906. The first true bit line 902 is connected to the gate of a first NMOS transistor 908. The drain terminal of this NMOS transistor 908 is connected via a fuse 910 to a first wordline 912, and the source terminal is connected directly to ground. Since bit 7 is a logic zero, which corresponds to approximately zero volts dc, the first NMOS transistor 908 should be operating in the cut-off region, thus keeping the wordline 912 at approximately five volts dc or at a logic one level. This is assuming that the fuse 910 is intact and completes the circuit between the true bit line 902 and the first wordline 912.

It should be noted that the programmable detection circuit 900 of the present invention has been implemented using a NOR gate array configuration as illustrated by the NOR circuitry contained in the dashed box 907, and thus the wordlines, which receive the output of this NOR gate array, should be at a logic level of zero if there is no error associated with the particular operational code.

In this example, the operational code to be detected is a 01 and up to this point, the wordline 912 is at a logic one level. Thus, so far, the wordline 912 is set to a level indicating an error condition. However, bit 7 as stated before has also been introduced to the programmable detection circuit 900 through the first complement bit line 904. The first complement bit line 904 is connected to an inverter 914 which inverts the logic value of any incoming signal.

In this example, bit 7 is a logic level zero; however, after passing through the inverter 914, it is now at logic level one and it is this inverted signal that is introduced to the gate terminal of a second NMOS transistor 916. The drain terminal of this second NMOS transistor 916 is connected via a fuse 918 to the first wordline 912, and the source terminal is connected directly to ground. With a logic one level, which corresponds to approximately five volts dc at the gate of this second NMOS transistor 916, the transistor 916 should be operating in the conduction region and will pull the wordline 912 down to approximately zero volts. Since it is desired that the programmable detection circuit 900 detect the 01 operational code, it is necessary to keep the wordline 912 at a logic level of one or approximately five volts. Therefore, in order to prevent the second NMOS transistor 916 from bringing the wordline 912 down, fuse 918 should be blown to cause an open circuit. With the fuse 918 open, wordline 912 should remain at logic level of one because NMOS transistor 908 maintains the wordline 912 at a high level.

The second bit, bit 6, of the instruction given in equation 1 is brought into the programmable detection circuit 900 via a second true bit line 920 and a second complement bit line 922. The second true bit line 920 is connected to the gate terminal of a third NMOS transistor 924. The drain terminal of this NMOS transistor 924 is also connected via a fuse 926 to the first wordline 912, and the source terminal is connected directly to ground as before. Since bit 6 is a logic level one, the third NMOS transistor 924 is in the conduction state and thus would bring wordline 912 to a logic zero level. Since it is desired that the wordline 912 be at a logic one level, fuse 926 should be blown so as to cause an open circuit thereby once again preventing the wordline 912 from being brought down. The second complement bit line 922 is connected to a second inverter 928 which once again inverts the logic level of the signal coming in. In this example, bit 6 is at logic level one; however, after passing through the inverter 928 it is now at a logic level zero and this new value is introduced to the gate terminal of a fourth NMOS transistor 930. The source terminal of this fourth NMOS transistor 930 is connected via a fuse 932 to the first wordline 912, and the source terminal is connected to ground. Since the value at the gate is now a logic zero, this fourth NMOS transistor 930 should be operating in the cut-off region, thus keeping the wordline 912 at approximately five volts or logic level one.

By blowing fuse 918 and fuse 926 the programmable detection circuit 100 is programmed to detect the presence of operational code 01. The presence of operational code 01 causes two events to occur. The first event that occurs is that wordline 912, which is at a logic one level and which is also connected to the first loadable RAM 410 as shown in FIG. 1, is used to select the microinstruction that will replace the microinstruction that is in error. Basically, this wordline 912 is a hardwired addressable point in the first loadable RAM 410. The second event that occurs is that the logic level value on the wordline is fed through a logic NOR gate 934 to the multiplexor selection logic circuit 800 as shown in FIG. 1. With only a single wordline, the logic NOR gate 934 is unnecessary; however, if the system is implemented utilizing a plurality of wordlines, then some type of logic selection circuitry is necessary.

As is shown in FIG. 2, there can be a plurality of instruction bit lines, where each instruction bit line consists of a true bit line and a complement bit line. The number of instruction bit lines is determined by the number of bits in a particular operational code, which can vary from two bits up to thirty-two bits in length. Each of the individual instruction bit lines is connected to one of the dual transistor and fuse circuits to a plurality of word lines. Each of the dual circuits are identical, as indicated by the prime notation on the element numbers of identical components. The number of wordlines is determined by the number of individual operational codes that need to be detected For example, if only one operational code needed to be detected as in the above example, only the single wordline 912 would be needed; however, with a two-bit operational code, there can be four different operational codes, and thus there is the possibility of having mistakes on all four corresponding macroinstructions. Assuming we want to be able to correct up to three macroinstructions, then three wordlines would be required. As was stated previously, if there is more than one wordline required, a separate logic circuit is needed. In this embodiment, a logic NOR gate 934 has been utilized. The logic NOR gate 934 will only output a logic one, indicating no detection of a predetermined operational code, when all the wordlines are at logic level zero values. If any wordline is at a logic level of one, then the logic NOR gate 934 will output a zero valued DETN signal to the multiplexor selection logic circuit 800 shown in FIG. 1.

Many different methods can be utilized to implement the programmable detection circuit utilized in the present invention. In this embodiment, a NOR gate array configuration has been utilized, but it could have been implemented utilizing a XOR or NAND gate configuration. A NOR gate configuration does not mean the use of actual NOR gates, but rather the dual NMOS transistor and fuse configurations illustrated in FIG. 2. Basically, this configuration allows for the implementation of the NOR logic which is if any bit out of a multiple configuration is a logic one, then the output of the gate is a logic zero, otherwise, the output is a logic one. The programmable NOR array as shown in FIG. 2 is the one most suitable for the implementation in VLSI. The programmable NOR gates in the array can be implemented with laser or electrical programmable fuses. Before being programmed, the output form the NOR gate is always low for all addresses. When programmed, appropriate fuses are blown so that the output is switched to high value for a given operational code. Each NOR gate in the array can be programmed such that it will respond to a different operational code. The outputs of these NOR gates are then NORed together to generate the DETN signal. The maximum number of operational codes which can be detected and executed through address manipulation is equal to the number of NOR gates in the array.

While the invention has been particularly shown and described with respect to the preferred embodiments thereof, it should be understood by those skilled in the art that the foregoing and other changes in form and detail may be made therein without departing from the spirit and scope of the invention which should be limited only by the scope of the appended claims.

What is claimed is:

1. In a microprocessor system having a register means for receiving a macroinstruction, a control store memory for storage and output of microinstructions associated with a macroinstruction, and a microsequencer means for producing a next address signal to address a next executable microinstruction, an apparatus for correcting one or more faulty microinstructions contained in said control store, said apparatus comprising:
   (a) a programmable detection circuit means coupled to said register means and programmed to detect a macroinstruction previously determined to have one or more faulty microinstructions associated therewith, said programmable detection circuit means outputting a decoder signal and a detection signal upon detection of said macroinstruction;
   (b) a first programmable memory array for receiving said decoder signal and programmed to contain a first error free microinstruction, said first memory array outputting said first error-free microinstruction for further processing in response to said decoder signal;
   (c) a second programmable memory array for receiving said next address signal and programmed to contain one or more error-free microinstructions corresponding to said faulty microinstructions contained in said control store, said second programmable memory array outputting said one or more error-free microinstructions for further processing in response to said next address signal;
   (d) selecting means responsive to said detection signal and said next address signal for selecting an error-free microinstruction output from one of said control store memory, said first programmable array and said second programmable array.

2. The apparatus according to claim 1 wherein said selecting means includes:
   (a) a multiplexor circuit means for selecting an output from one of said control store memory, said first programmable array, and said second programmable array, each coupled as inputs to said multiplexor circuit, and
   (b) a multiplexor selection logic circuit for controlling said multiplexor circuit in response to said detection signal from said programmable detection circuit and said next address from said microsequencer means, each coupled as inputs to said multiplexor selection logic circuit.

3. The apparatus according to claim 2, wherein said predetermined macroinstruction constitutes a plurality of bits and said programmable detection circuit comprises:
   (a) a plurality of instruction bit lines, said plurality of bit lines each providing one bit of said predetermined macroinstruction to said programmable detection circuit;
   (b) a plurality of dual transistor and fuse circuits connected to said plurality of instruction bit lines, said plurality of dual transistor and fuse circuits transfer a logic level voltage onto one of a plurality of wordlines based on a predetermined logic scheme; and
   (c) a logic device connected to said plurality of wordlines, said logic device logically calculating said detection signal based on the logic level voltage on each of said plurality of wordlines and transmits said detection signal to said multiplexor selection logic circuit.

4. The apparatus according to claim 3, wherein said plurality of instruction bit lines comprises:
   (a) a true instruction bit line which transmits one bit of said predetermined macroinstruction to said programmable detection circuit; and
   (b) a complement instruction bit line which transmits a complement logic value of one bit of said predetermined macroinstruction to said programmable detection circuit.

5. The apparatus according to claim 4, wherein said complement instruction bit line comprises a logic inverter circuit.

6. The apparatus according to claim 5, wherein said plurality of dual transistor and fuse circuits each comprises:
   (a) a first transistor connected to said true instruction bit line at a first terminal, connected to one of said plurality of worklines at a second terminal, and connected to ground at a third terminal; and
   (b) a second transistor connected to said complement instruction bit line at a first terminal, connected to one of said plurality of wordlines at a second terminal, and connected to ground at a third terminal.

7. The apparatus according to claim 6, wherein said plurality of dual transistor and fuse circuits each further comprises a first fuse connected between said second terminal of said first transistor and said wordline, and a second fuse connected between said second terminal of said second transistor and said wordline.

8. The apparatus according to claim 7, wherein said first and second fuses are selectively blown in response to the detection of said predetermined macroinstruction having at least one faulty microinstruction causing an open circuit between said first and second transistor and said plurality of wordlines.

9. The apparatus according to claim 8 wherein said first and second fuses are laser programmable fuses.

10. The apparatus according to claim 8 wherein said first and second fuses are electrically programmable fuses.

11. The apparatus according to claim 8, wherein said dual transistor and fuse circuits having selectively blown fuses are configured to operate in response to said predetermined macroinstruction.

12. The apparatus according to claim 11, wherein said first and second transistors are NMOS-type transistors, said NMOS-type transistors are configured to operate in the conduction mode of operation when a logic one value is introduced to said first terminal and in the cutoff mode of operation when a logic zero value is introduced to said first terminal.

13. The apparatus according to claim 12, wherein said plurality of wordlines are connected to a logic gate, said logic gate logically comparing the logic values on said plurality of wordlines and outputing said detection signal to said multiplexor selection logic circuit.

14. The apparatus according to claim 13, wherein said logic gate is a NOR gate.

15. The apparatus according to claim 12, wherein at least one of said plurality of wordlines is connected to said first programmable array, said at least one of said plurality of wordlines selects said at least one error free microinstruction.

16. The apparatus according to claim 12, wherein said first programmable array is a first loadable RAM that contains the first microinstruction of said at least one error free microinstruction to replace said at least one faulty microinstruction.

17. The apparatus according to claim 16, wherein said first loadable RAM is implemented utilizing a dynamic RAM.

18. The apparatus according to claim 16, wherein said first loadable RAM is implemented utilizing a static RAM.

19. The apparatus according to claim 16, wherein said first loadable RAM is implemented utilizing an electrically erasable PROM.

20. The apparatus according to claim 12, wherein said second programmable array is a second loadable RAM that contains said one or more addressable error free microinstructions for output in place of said faulty microinstructions of said predetermined macroinstruction.

21. The apparatus according to claim 20, wherein said second loadable RAM is implemented utilizing a static RAM.

22. The apparatus according to claim 20, wherein said second loadable RAM is implemented utilizing an electrically erasable PROM.

23. The apparatus according to claim 20, wherein said second loadable RAM is implemented utilizing a dynamic RAM.

24. A method for correcting a faulty microcode contained in a control store of a microprogrammed processor, said method comprising the steps of:
   (a) detecting a predetermined macroinstruction having at least one faulty microinstruction contained in said control store;
   (b) outputting a first error-free microinstruction from a first programmable memory array upon detection of said predetermined macroinstruction;
   (c) sequentially addressing one or more error-free microinstructions stored in a second programmable memory array, and sequentially outputting said one or more error-free microinstructions from said second programmable array; and
   (d) selecting said error-free microinstruction for execution thereof from one said control store, said first programmable memory array, and said second programmable memory array.

25. The method according to claim 24, wherein said detecting step comprises the steps of:
   (a) selectively programming a plurality of dual transistor and fuse circuits to operate as a logic gate in response to said predetermined macroinstruction; and
   (b) directly addressing said first programmable array in response to the output of said plurality of dual transistor and fuse circuits.

26. The method according to claim 25, wherein said selecting step includes the step of generating a select signal in response to the output of said plurality of dual transistor and fuse circuits and a next address signal obtained from a previously executed error free microinstruction.

* * * * *